Figure 1:
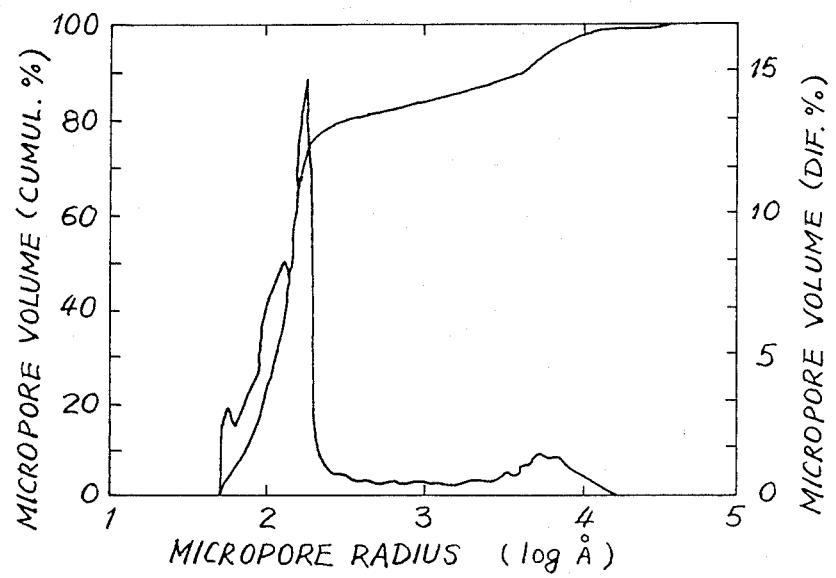

United States Patent [19]

Rikimaru et al.

[11] Patent Number: 4,859,439

[45] Date of Patent: Aug. 22, 1989

[54] CATALYST AND A METHOD FOR DENITRIZING NITROGEN OXIDES CONTAINED IN WASTE GASES

[75] Inventors: Hiroaki Rikimaru; Tadao Nakatsuji; Toshikatsu Umaba; Kuzuhiko Nagano; Kazuya Mishina; Hiromitsu Shimizu, all of Osaka, Japan

[73] Assignees: Sakai Chemical Industry Co., Ltd., Sakai; Mitsubishi Jukogyo Kabushiki Kaisha, Tokyo; Mitsubishi Petrochemical Co., Ltd., Tokyo; Mitsubishi Petrochemical Engineering Co., Ltd., Tokyo; Catalysts & Chemicals Industries Co., Ltd., Tokyo, all of Japan

[21] Appl. No.: 102,639

[22] Filed: Sep. 30, 1987

[30] Foreign Application Priority Data

Sep. 30, 1986 [JP] Japan ................................ 61-234031

[51] Int. Cl.$^4$ ........................... B01J 8/00; C01B 17/00
[52] U.S. Cl. .................................................. 423/239
[58] Field of Search ........................... 423/239, 239 A

[56] References Cited

U.S. PATENT DOCUMENTS 4,152,296  5/1979  Okabe et al. ......................... 423/239
4,187,282  2/1980  Matsuda et al. ..................... 423/239

Primary Examiner—Gregory A. Heller
Attorney, Agent, or Firm—Wenderoth, Lind & Ponack

[57] ABSTRACT

A catalyst for denitrizing nitrogen oxides contained in waste gases, which comprises:
(a) titanium, and
(b) at least one base metal selected from the group consisting of V, W, Mo, Mn, Cu, Fe, Cr, Co, Ni, Zn and Sn, the catalyst containing titanium and the base metals in amounts of at least about 50% by weight in terms of oxides based on the catalyst, and titanium in amounts of about 80-99% by weight in terms of oxides and the base metals in amounts of about 20-1% by weight in terms of oxides, respectively, based on the total weight in terms of oxides of titanium and the base metals, and the catalyst having micropores of about 50-75000 Å in radius in amounts of about 0.25-0.45 ml/g, and micropores of about 50-100 Å in radius in amounts of about 10-40% by volume and micropores of about 500-60000 Å in radius in amounts of not less than about 10% by volume, respectively, based on the total volume of the micropores of about 50-75000 Å in radius, in the presence of a reducing gas at elevated temperatures.

The catalyst retains a higher denitrizing activity over a long period time than the conventional catalysts, and is substantially free from deactivation with arsenic or arsenic compounds contained in waste gases.

6 Claims, 1 Drawing Sheet

CATALYST AND A METHOD FOR DENITRIZING NITROGEN OXIDES CONTAINED IN WASTE GASES

This invention relates to a catalyst and a method for denitrizing nitrogen oxides contained in waste gases. More particularly, the invention relates to a catalyst for denitrizing nitrogen oxides which retains a high catalytic acitivity over a long period, and especially, to a catalyst which is resistant to deactivation or poisoning by arsenic compounds such as diarsenic trioxide contained in waste gases together with nitrogen oxids. The invention further relates to a method of denitrizing such waste gases by use of such catalysts.

Denitrizing processes have been recently developed and the processes are industrially carried out in many plants today, to convert noxious nitrogen oxides into innoxious compounds or to remove them from the waste gases. In an exemplified denitrizing process, combustion waste gases from coal-fired boilers which contain nitrogen oxides therein is admixed with a reducing gas, and the resultant gas mixture is put into contact with a denitrizing catalyst, thereby to reduce the nitrogen oxides into innoxious compounds. A variety of processes are already known, but a selective catalytic reduction process in which ammonia is used as a reducing gas is said most advantageous from the standpoint of controllability of catalytic reduction reactions of nitrogen oxides and process economy.

Heretofore, the process has been applied only to waste gases which contain no arsenic compounds therein or contain arsenic compounds in such trace amounts as give substantially no influence upon catalytic activity of denitrizing catalysts. However, a substantial amount of arsenic compounds is occasionally contained in combustion waste gases from coal-fired boilers depending upon the coal used as a fuel, and it has been noted very recently that denitrizing catalysts are deactivated or poisoned within a short period of time by arsenic compounds when the catalysts are put into contact with such arsenic compounds.

It is, therefore, an object of the invention to provide an economical denitrizing catalyst which retains a high catalytic activity of denitrization over a long period of time.

It is a further object of the invention to provide a denitrizing catalyst which is especially useful for denitrizing waste gas containing a substantial amount of arsenic compounds therein.

It is also an object of the invention to provide a method of catalytic denitrization of waste gases which contain a substantial amount of arsenic compounds therein with only slight decrease in denitrizing activity of catalysts.

According to the invention there is provided a catalyst for denitrizing nitrogen oxides contained in waste gases, which comprises:

(a) titanium, and
(b) at least one base metal selected from the group consisting of V, W, Mo, Mn, Cu, Fe, Cr, Co, Ni, Zn and Sn, the catalyst containing titanium and the base metals in amounts of at least about 50% by weight in terms of oxides based on the catalyst, and titanium in amounts of about 80–99% by weight in terms of oxides and the base metals in amounts of about 20–1% by weight in terms of oxides, respectively, based on the total weight in terms of oxides of titanium and the base metals, and the catalyst having micropores of about 50–75000 Å in radius in amounts of about 0.25–0.45 ml/g, and micropores of about 50–100 Å in radius in amounts of about 10–40% by volume and micropores of about 500–60000 Å, preferably of about 1000–60000 Å in radius in amounts of not less than about 10% by volume, respectively, based on the total volume of the micropores of about 50–75000 Å in radius.

It is preferred that the metal elements contained in the catalyst are in the form of oxides. In particular, when titanium is contained as titanium dioxide in the catalyst, it is preferred that the titanium dioxide has crystallites preferably of 100–500 Å, most preferably of 100–250 Å, so that the catalyst has a high resistance to deactivation with arsenic or arsenic compounds. The titanium in the catalyst of the invention may be in part replaced by Si or Zr or both.

The catalyst of the invention contains titanium and at least one base metal selected from the group consisting of V, W, Mo, Mn, Cu, Fe, Cr, Co, Ni, Zn and Sn. The titanium and the base metals are contained in the catalyst in amounts of at least about 50% by weight in terms of oxides based on the weight of the catalyst, and titanium in amounts of about 80–99% by weight in terms of oxides and the base metals in amounts of about 20–1% by weight in terms of oxides, respectively, based on the total weight in terms of oxides of titanium and the base metals.

When the total amount of titanium and the base metals in the catalyst is less than the above, the catalyst is too low in denitrizing activity, and when the amounts of titanium and the base metals, respectively, are less or more than the above specified, the resultant catalyst is readily deactivated by arsenic compounds contained in waste gases within a short period of time, or the catalyst is too low in initial catalytic activity.

The catalyst of the invention is further characterized in its dual micropore structures. The catalyst has micropores of about 50–75000 Å in radius in amounts of 0.25–0.45 ml/g, and micropores of about 50–100 Å in radius in amounts of about 10–40% by volume and micropores of about 500–60000 Å, preferably of about 1000–60000 Å in radius in amounts of not less than about 10% by volume, respectively, based on the total volume of the micropores of about 50–75000 Å in radius.

It has now been found out that the above-mentioned dual micropore structures unexpectedly permits the catalyst to retain a high denitrizing activity over a long period of time. However, when the catalyst has uniform micropore structures, this being the case with the conventional titanium dioxidebased denitrizing catalysts, in place of the dual micropore structures, it has a low initial denitrizing acitivity or it is readily deactivated with arsenic or arsenic compounds contained in waste gases within a short period of time, since arsenic or arsenic compounds are concentratedly adsorbed and located in the surface layer of the catalyst in the course of denitrzation.

The reason why the dual micropore structures of the catalysts are substantially freed from the deactivation with arsenic or arsenic compounds is not yet clear. However, it is likely that arsenic or arsenic compounds are initially adsorbed on the surface layer of the catalysts, but they then gradually diffuse into the inside of the catalyst without remaining in the surface layer, and as a result, the concentration of arsenic or arsenic compounds in the surface layer of the catalysts remains smaller than in the uniform micropore structures. It has been generally accepted that the denitrizing reaction takes place in the surface layer of the catalyst up to about 100 μm in depth from the surface. Arsenic or arsenic compounds will diffuse into the inside of the catalysts deeper the surface layer, which thus diminishes the amount of arsenic or arsenic compounds in the surface layer, thereby permitting to remain the layer substantially unpoisoned therewith.

It has been heretofore further accepted that the denitrizing activity of catalysts is associated with the presence of micropores of about 100 Å in radius in the surface layer of the catalysts. The reason why the beforesaid dual micropore structures provide catalysts a higher denitrizing activity has not yet been clarified, however, it is likely that the dual micropore structures permit readily diffusion of gas molecules into and within the catalyst, whereas the conventional uniform micropore structures more or less restrict the diffusion of gas molecules within the catalyst since the radii of gas molecules are somewhat comparable with the sizes of micropores.

It is also already known that the denitrizing acitivy of the catalyst decreases with time since calcium salts, silica, sodium sulfate or vanadium more or less contained in waste gases deposit on the surface layer of the catalysts, However, the dual micropore structures provide catalysts with a substantially reduced wear-resistance compared with the uniform micropore structures. Therefore, the surface layer of the catalysts is readily worn or cleaned with dusts that are usually contained in waste gases, so that the catalysts have always renewed and cleaned active surface layers. On the other hand, the conventional catalysts having uniform micropore structures are excessively wear-resistant, so that the surface layer cannot be readily worn or cleaned with dusts, and the deposits on the surface layer remains there, to decrease the denitrizing activity with time.

The catalyst of the invention may be produced in any conventional manner known in the art. Some methods are as follows, for example:

(a) Titanium dioxide is first molded into a desired shape, and then the mold is impregnated with compounds of base metals. In this method, the titanium dioxide mold may be impregnated with all the base metal compounds to be incorporated into the catalyst at the same time, or the mold is first impregnated with one or more base metal compounds, dried or calcined, and then with other base metal compounds, and dried or calcined. The order of impregnation is not specifically limited.

(b) Titanium dioxide and base metal compounds are kneaded together, molded to a desired shape, and dried or calcined.

(c) Titanium dioxide and one or more base metal compounds are kneaded together, molded to a desired shape, dried, calcined and then impregnated with other base metal compounds and dried or calcined.

(d) Titanium dioxide precursors such as metatitanic acid or orthotitanic acid which are converted into titanium dioxide by heating are mixed with aqueous solutions of base metal compounds, and the resultant mixture is dried, calcined, pulverized and molded.

(e) Aqueous solutions of titanium dioxide precursors such as titanium tetrachloride or titanium sulfate are mixed with aqueous solutions of base metal compounds, and the resultant coprecipitates are separated by filtration, washed with water, dried, calcined, pulverized and molded.

Among the methods as above, the methods (d) and (e) are preferred. However, when it is desired that catalytically active components be contained in a high concentration in the surface layer of the catalyst so that the catalyst has a high initial denitrizing activity, the following method (f) is preferred.

(f) A titanium dioxide mold is immersed in or impregnated with aqueous solutions of base metal compounds, and then the mold is rapidly dried.

In the production of the catalyst of the invention, titanium dioxide and various precursors of titanium dioxide such as titanic acid, titanium hydroxide, titanium sulfate or titanium tetrachloride may be usable as titanium components. Furthermore, precipitates obtained by reacting titanium compounds such as titanium halides or titanium sulfate with water, ammonia water or alkali carbonates may also be usable as titanium components.

Similarly to titanium components, various base metal compounds are usable as base metal components, however, base metal compounds which provide oxides by heating are preferably used. The base metal components are usually used in the form of nitrates, sulfates, halides or ammonium salts.

The dual micropore structures are formed by calcining molds which contain therein organic materials which burn out when the molds are calcined. As such organic materials, thermoplastic resins such as polyethylene, polypropylene, polyvinyl alcohol, polyethylene oxide, polyacrylamide or polystyrene, cellulosic materials such as crystalline cellulose or methyl cellulose, urea, ammonium stearate, waxes, organic fibers such as acrylic fibers or silk fibers, lactose, corn starch, wheat flour and the like are usable. Inorganic materials such as ammonium carbonate are also usable.

Other molding auxiliaries such as binders may be used when molds are formed, when necessary.

The catalyst of the invention may contain clay substances such as montmorillonite, terra alba, bentonite, kaolin, halloysite or sericite; inorganic oxides such as porous silica, alumina, silica, magnesia or zirconia; and heat-resistant inorganic fibers such as glass wool, glass fibers, rock wool or other ceramic fibers, to improve moldability of mixtures of the components in the production of the catalysts, or to provide a high mechanical strength with the catalysts obtained. These additives may be contained in the catalyst in amounts of not more than about 50% by weight based on the weight of the catalyst.

The catalyst of the invention is not specifically limited in shapes and dimensions, but may be in any shape of any dimensions, and therefore, it may be in the form of pellets, spheres, plates, tubes or honeycombs, for example. Any molding method is adoptable in the production of the catalyst. By way of example, extrusion, tableting or tumbling granulation may be employed depending upon the required properties.

According to the invention, there is provided a method for denitrizing nitrogen oxides contained in waste gases which contain a substantial amount of arsenic compounds as well therein, which comprises putting the waste gases into contact with the catalyst as described hereinbefore in the presence of a reducing gas, at elevated temperatures, thereby to convert the nitrogen oxides, which include nitrogen monoxide, dinitrogen trioxide, nitrogen dioxide and nitrogen hexaoxide, into innoxious compounds.

The use of the catalyst of the invention for denitrizing nitrogen oxides in waste gases permits the retention of a high initial denitrizing activity of the catalyst even when the waste gases contain a substantial amount of arsenic compounds therein.

In the method of the invention, the reducing gas may be either hydrogen, hydrocarbons, carbon monoxide or ammonia, however, ammonia is most preferred as described hereinbefore. The amount of the reducing gases used is usually not more than about 10 times, and is preferably in the range of about 0.2–2 times, as much as the stoichiometric amount needed to reduce the nitrogen oxides contained in waste gases. When ammonia gas is used, it is preferred that the amount is not more than the stoichiometric amount needed to reduce the nitrogen oxides contained in waste gases to prevent secondary pollution due to unreacted ammonia. The most advantageous amount of ammonia is in the range of 0.2–1.0 times as much as the stoichiometric amount needed to reduce the nitrogen oxides in waste gases.

In the method of the invention, the waste gases are put into contact with the catalyst preferably at temperatures of about 100–550° C., more preferably of about 200–500° C., most preferably of about 250–400° C., in the presence of a reducing gas. Usually the waste gases are passed through as a mixture with a reducing gas a reactor having the catalysts fitted therein. The space velocity of the gas mixture is preferably in the range of 1000–100000 hr$^{-1}$, more preferably 2000–50000 hr$^{-1}$, most preferably 3000–30000 hr$^{-1}$ at pressure of about 1–10 kg/cm$^2$.

The catalyst and method of the invention are suitably applicable to denitrizing of waste gases which contain nitrogen oxides and arsenic compounds, and they are especially useful when used for denitrization of combustion waste gases which contain about 100–1000 ppm of nitrogen oxides, mainly nitrogen monoxide, about 200–2000 ppm of sulfur oxides, mainly sulfur dioxide, about 1–10% by volume of oxygen, about 5–20% by volume of carbon dioxide, about 5–20% by volume of water vapor, and a substantial amount of arsenic compounds, i.e. not less than about 0.001 ppm. The catalyst and method of the invention are most useful when they are used for denitrization of combustion waste gases from coal-fired boilers which contain arsenic oxides, mainly diarsenic trioxide, in amounts of about 0.10–1.0 ppm since when the conventional catalysts are used to denitrize such waste gases, they are deactivated within a very short time of period. However, the method of the invention is not specifically limited in the concentration of arsenic oxides in waste gases.

The invention will be more easily understood with reference to the following examples, which however are intended to illustrate the invention only and are not to be construed as limiting the scope of the invention.

EXAMPLE 1

An amount of 3.2 kg of barium chloride dihydrate was added to 40 kg (in terms of TiO$_2$) of metatitanic acid cake obtained as an intermediate in the production of titanium dioxide by a sulfuric acid process, to partially peptize the metatitanic acid. Then 10 liters of 10% methyl amine solution containing 4.4 kg of ammonium paratungstate were added to the metatitanic acid and fully stirred. The resultant mixture was dried at 100° C. for 12 hours, calcined at 450° C. for 3 hours, left standing to reach room temperature, and then pulverized, to provide powders of titanium dioxide mixed with tungsten oxides.

An amount of 15 liters of water was added to 40 kg of the above titanium dioxide powders together with 1.25 kg of polyvinyl alcohol, 1.2 kg of a thermoplastic resin, and 2.5 kg of glass chopped strands of 5 mm in fiber length and 9 $\mu$m in diameter (Nitto Boseki K.K., Japan), and the resultant mixture was kneaded.

The kneaded mixture as then molded into a honeycomb structure by use of a screw extruder provided with a honeycomb forming nozzle. The thus obtained mold was left standing for drying for a sufficient period of time, and then air dried at 100° C. for 5 hours. The mold was then cut at both axial ends to a predtermined length, and calcined at 450° C. for 3 hours in an electric oven, to provide a honeycomb catalyst A of 7.4 mm in cell pitch, 1.35 mm in wall thickness, 70 mm$\times$70 mm in outer diameter, 500 mm in axial length and 5.9 mm in equivalent diameter.

A further catalyst was prepared by use of the catalyst A. An amount of 0.48 kg of oxalic acid and 0.19 kg of ammonium metavanadate were added to water to form 1 liter of an aqueous solution of vanadyl oxalate in concentrations of 150 g/l in terms of vanadium pentoxide, which was then diluted to a concentration of 17.9 g/l with water.

The aforesaid honeycomb catalyst A was immersed in the above diluted vanadyl oxalate solution at normal temperatures, air dried at normal temperatures for 2.5 hours, heated to 100° C. in 5 hours, dried at the temperature for 5 hours, and calcined at 450° C. for 3 hours, to provide a honeycomb catalyst B.

EXAMPLE 2

An amount of 0.96 kg of oxalic acid and 0.38 kg of ammonium metavanadate were dissolved in water to provide 2 liters of a solution of vanadyl oxalate.

To 40 kg of the same titanium oxide powder mixed with tungsten oxides as in Example 1 were added 2 liters of the solution of vanadyl oxalate, 1.25 kg of polyvinyl alcohol, 1.2 kg of a thermoplastic resin, 2.5 kg of the same glass chopped strands as in Example 1 and about 13 liters of water, and the resultant mixture was kneaded together.

The kneaded mixture was then molded into a honeycomb structure and dried, and the mold was cut at both axial ends to a predtermined length, and calcined in the same manner as in Example 1, to provide a honeycomb catalyst C of the same dimensions as in Example 1.

EXAMPLE 3

An amount of 3.2 kg of barium chloride dihydrate was added to 40 kg (in terms of TiO$_2$) of metatitanic acid cake obtained as an intermediate in the production of titanium dioxide by a sulfuric acid process, to partially peptize the metatitanic acid. Then the metatitanic acid was calcined at 450° C. for 3 hours, to provide powders of activated titania.

An amount of 3.20 kg of oxalic acid and 1.27 kg of ammonium metavanadate were dissolved in water to provide 7 liters of a solution of vanadyl oxalate.

To 36 kg of the activated titania powders were added 7 liters of the vanadyl oxalate solution, 1.25 kg of polyvinyl alcohol, 1.2 kg of a thermoplastic resin, 2.5 kg of the same glass chopped strands as in Example 1 and about 8 liters of water, and the resultant mixture was kneaded together.

The kneaded mixture as then molded into a honeycomb structure and dried, and the mold was cut at both axial ends to a predetermined length, and calcined in the same manner as in Example 1, to provide a honeycomb catalyst D of the same dimensions as in Example 1.

As a denitrizing experiment I, a gas mixture composed of 200 ppm of nitrogen oxides, 200 ppm of ammonia, 4% by volume of oxygen, 10% by volume of water vapor, 12% by volume of carbon dioxide, 800 ppm of sulfur dioxide, and the balance

TABLE 1

| Catalysts | $TiO_2^{(1)}$ (%) | Metal Components (%)[2] | | | | Micropore Volumes | | |
|---|---|---|---|---|---|---|---|---|
| | | $TiO_2$ | $WO_3$ | $MoO_3$ | $V_2O_5$ | Total[3] (ml/mg) | 50–100 Å[4] (%) | 1000–60000 Å[5] (%) |
| A  | 78.9 | 91.0 | 9.0 | —   | —   | 0.32 | 21.4 | 16.2 |
| B  | 78.5 | 90.5 | 8.9 | —   | 0.6 | 0.31 | 21.9 | 21.6 |
| C  | 78.3 | 90.3 | 8.9 | —   | 0.8 | 0.32 | 20.0 | 19.2 |
| D  | 76.4 | 88.4 | 8.7 | —   | 2.9 | 0.32 | 20.6 | 19.6 |
| E  | 78.4 | 90.4 | —   | 8.8 | 0.8 | 0.32 | 37.2 | 16.6 |
| F  | 76.4 | 90.4 | 4.4 | 4.4 | 0.8 | 0.31 | 20.9 | 19.6 |
| A' | 78.9 | 91.0 | 9.0 | —   | —   | 0.27 | 67.0 | 3.4  |
| B' | 78.5 | 90.5 | 8.9 | —   | 0.6 | 0.26 | 41.2 | 4.0  |
| C' | 78.3 | 90.3 | 8.9 | —   | 0.8 | 0.27 | 27.9 | 6.6  |
| D' | 76.4 | 88.4 | 8.7 | —   | 2.9 | 0.27 | 40.0 | 5.0  |
| E' | 78.4 | 90.4 | —   | 8.8 | 2.9 | 0.27 | 71.8 | 11.3 |
| F' | 76.4 | 90.4 | 4.4 | 4.4 | 0.8 | 0.26 | 61.5 | 2.7  |

Notes:
[1] % by weight of titanium dioxide based on the weight of the catalyst.
[2] % by weight based on the total weight of $TiO_2$ and oxides of the base metals in the catalyst.
[3] Volume of micropores of about 50–75000 Å in radius.
[4] % by volume of micropores of 50–100 Å in radius.
[5] % by volume of micropores of 1000–60000 Å in radius.

EXAMPLE 4

An amount of 4.8 kg of ammonium paramolybdate was used in place of ammonium paratungstate in Example 1, to provide powders of titanium dioxide mixed with molybdenum oxides. A denitrizing catalyst E was prepared in the same manner as in Example 2 by use of the titanium dioxide powders.

EXAMPLE 5

A denitrizing catalyst F was prepared in the same manner as in Example 2 by use of 20 kg of the titanium dioxide powders mixed with tungsten oxides as obtained in Example 1 and 20 kg of the titanium dioxide powders mixed with molybdenum oxides as obtained in Example 4.

REFERENCE EXAMPLES

Denitrizing catalysts A' to F' were prepared without the use of thermoplastic resins and otherwise in the same manner as in Examples 1 to 5, respectively.

Compositions of Catalysts

The compositions of catalysts are shown in Table 1.

Micropore Distribution

The micropore volume and micropore size distribution of the catalysts A to F and A' to F' were measured with a mercury penetration type porosimeter (1500 kg/cm² porosimeter by Carlo Erba Strumentazione). The results are shown in Table 1.

Figure 2:
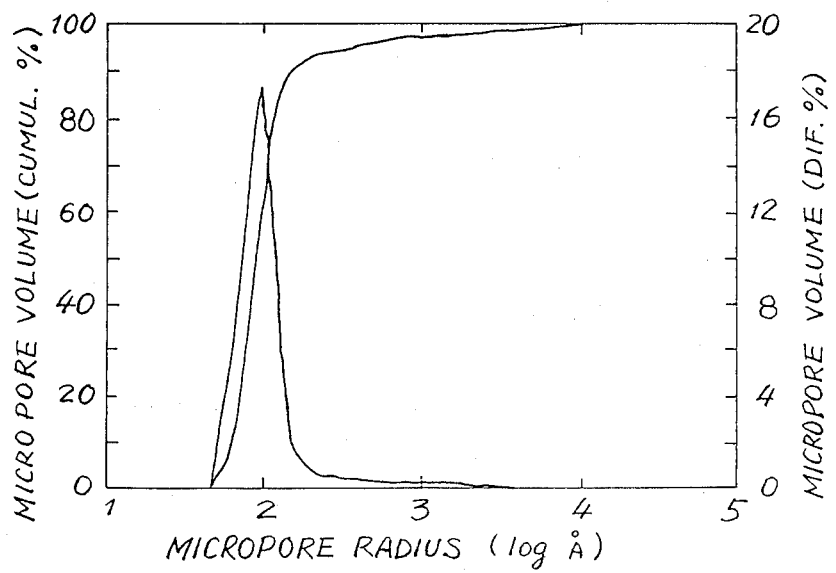

FIGS. 1 and 2 show the micropore volume distributions of the catalyst A and A', respectively. It is apparent that the catalyst of the invention has the dual micropore structures, whereas the conventional catalyst has uniform micropore structures of micropores of about 100 Å in radius.

Denitrizing Activity

The catalysts were cut into honeycombs of 300 mm in length and having nine openings extending therethrough in 3×3 cells, respectively.

nitrogen was put into contact with the catalyst at 380° C. at a space velocity of 4700 hr$^{-1}$ for 5 hours, and denitrizing rates of the catalyst were measured.

The denitrizing rate is defined by ((NOx concentration at the inlet of a reactor)-(NOx concentration at the outlet of a reactor)/(NOx concentration at the inlet of a reactor))×100 (%).

A second denitrizing experiment II was carried out with a gas mixture containing 25 ppm of diarsenic trioxide in addition to the above components in the same manner as above, and denitrizing rates of the catalyst were measured.

The results are shown in Table 2.

Wear-Resistance of Catalysts

As a further experiment, the catalysts were cut into honeycombs of 100 mm in length and having 36 openings extending therethrough in 6×6 cells, respectively. Then the air containing silica powders of about 40 μm in average diamter in amounts of 70 g/Nm³ was passed through the catalysts at a rate of 40 m/sec. for 30 minutes. The wearresistance was measured according to the equation: (1-(initial weight of catalysts/weight of catalysts after wear experiment))×100 (%).

The results are also shown in Table 2, illustrating that the catalyst of the invention is more readily worn with silica than the conventional catalyst.

TABLE 2

| Catalysts | Denitrizing Rates (%) I | (%) II | Wear-Resistances (%) |
|---|---|---|---|
| A  | 91.5 | 82.4 | 17.5 |
| B  | 97.0 | 90.5 | 21.3 |
| C  | 97.1 | 91.4 | 15.9 |
| D  | 98.3 | 91.8 | 17.1 |
| E  | 96.9 | 90.5 | 16.2 |
| F  | 97.0 | 90.2 | 21.0 |
| A' | 85.0 | 63.5 | 12.8 |
| B' | 94.4 | 76.3 | 13.8 |
| C' | 94.0 | 78.7 | 11.0 |
| D' | 95.9 | 75.6 | 10.9 |
| E' | 93.0 | 76.9 | 10.7 |
| F' | 94.1 | 75.1 | 14.1 |

What is claimed is:

1. A method for denitrizing nitrogen oxides contained in waste gases which contain an amount of arsenic or arsenic compounds therein in amounts of not less than about 0.001 ppm, which comprises putting the waste gases into contact with a catalyst consisting essentially of, as active components:
    (a) titanium dioxide and
    (b) at least one base metal oxide selected from the group cosnisting of $V_2O_5$, $WO_3$ and $MoO_3$,
    the catalyst containing titanium and the base metals in amounts of at least about 50% by weight in terms of oxides based on the catalyst, and titanium in amounts of about 80–99% by weight in terms of oxides and the base metals in amounts of about 20–1% by weight in terms of oxides, respectively, based on the total weight in terms of oxides of titanium and the base metals,
    and the catalyst having micropores of about 50–75000 Å in radius in amounts of about 0.25–0.45 ml/g, and micropores of about 50–100 Å in radius in amounts of about 10–40% by volume and micropores of about 500–60000 Å in radius in amounts of not less than about 10% by volume, respectively, based on the total volume of the micropores of about 50–75000 Å in radius, in the presence of a reducing gas at elevated temperatures.

2. The method as claimed in claim 1, wherein the catalyst has micropores of about 1000–60000 Å in radius in amounts of not less than about 10% by volume based on the total volume of the micropores of about 50–75000 Å in radius.

3. The method as claimed in claim 1 wherein the reducing gas is ammonia.

4. The method as claimed in claim 1 wherein the waste gases contain arsenic or arsenic compounds in amounts of not less than about 0.001 ppm.

5. The method as claimed in claim 1 wherein the waste gases contain arsenic or arsenic compounds in amounts of not less than about 0.01 ppm.

6. The method as claimed in claim 1 wherein the temperature is in the range of about 100–550° C.

* * * * *